United States Patent
Bulan et al.

(10) Patent No.: US 8,666,117 B2
(45) Date of Patent: Mar. 4, 2014

(54) VIDEO-BASED SYSTEM AND METHOD FOR DETECTING EXCLUSION ZONE INFRACTIONS

(75) Inventors: Orhan Bulan, Greece, NY (US); Yao Rong Wang, Webster, NY (US); Robert P. Loce, Webster, NY (US); Edgar A. Bernal, Webster, NY (US); Zhigang Fan, Webster, NY (US); Graham S. Pennington, Webster, NY (US); David P. Cummins, Washington, DC (US)

(73) Assignee: Xerox Corporation, Norwalk, CT (US)

( * ) Notice: Subject to any disclaimer, the term of this patent is extended or adjusted under 35 U.S.C. 154(b) by 168 days.

(21) Appl. No.: 13/441,253

(22) Filed: Apr. 6, 2012

(65) Prior Publication Data

US 2013/0266185 A1 Oct. 10, 2013

(51) Int. Cl.
*G06K 9/00* (2006.01)
*G08G 1/16* (2006.01)

(52) U.S. Cl.
USPC ............................. 382/104; 382/291; 340/903

(58) Field of Classification Search
CPC ...................................................... G06Q 10/10
USPC ......... 382/100, 103–107, 155, 162, 168, 173, 382/181, 199, 209, 232, 254, 274, 276, 382/286–294, 305, 312; 340/932.2, 937, 340/903; 348/169, 148
See application file for complete search history.

(56) References Cited

U.S. PATENT DOCUMENTS

| | | | | |
|---|---|---|---|---|
| 6,081,206 A * | 6/2000 | Kielland | ...................... | 340/937 |
| 6,285,297 B1 | 9/2001 | Ball | | |
| 8,120,513 B2 * | 2/2012 | Ioli | ............................. | 340/932.2 |
| 2003/0076417 A1 * | 4/2003 | Thomas et al. | ............... | 348/169 |
| 2012/0007983 A1 * | 1/2012 | Welch | ........................... | 348/148 |
| 2012/0148105 A1 | 6/2012 | Burry et al. | | |
| 2012/0263352 A1 * | 10/2012 | Fan et al. | ...................... | 382/105 |
| 2013/0028481 A1 | 1/2013 | Wu | | |

OTHER PUBLICATIONS http://www.nytimes.com/2011/09/19/nyregion/uprooting-the-old-familiar-parking-meter.html?_4=1&goback+%2Egde_153603_member_72027013, Dated Sep. 18, 2011; 3 pgs.
www.streetsmarttechnology.com, retrieved from the internet Aug. 6, 2012, 10 pgs.
Wren et al., "Pfinder: Real-Time Tracking of the Human Body", in IEEE Transactions on Pattern Analysis and Machine Intelligence, Jul. 1997, vol. 19, No. 7, pp. 780-785.

(Continued)

*Primary Examiner* — Seyed Azarian
(74) *Attorney, Agent, or Firm* — Fay Sharpe LLP (57) ABSTRACT

A method for determining a parking violation includes receiving video data as a sequence of frames provided by a camera. The method includes defining a location of an exclusion zone in the video data. The method includes detecting a vehicle located in the defined exclusion zone. The detecting includes determining a background in an initial frame of the video data and determining a background in a select frame by applying a predetermined updating process. The detecting includes subtracting the background of the select frame from the initial frame to obtain an image difference. The detecting includes classifying the pixels in the image difference as foreground or background pixels and classifying the pixels in the foreground image as vehicle or non-vehicle pixels. The method includes determining a duration that the detected vehicle is in the exclusion zone based on a number of the sequence of frames including the detected vehicle.

20 Claims, 10 Drawing Sheets

(56) References Cited

OTHER PUBLICATIONS

Friedman et al., "Image segmentation in video sequences: A probabilistic approach", in Proc. of the Thirteenth Conference on Uncertainty in Artificial Intelligence (UAI), Aug. 1-3, 1997.

Stauffer et al., "Adaptive background mixture models for real-time tracking", in Proc. of the 1999 Conference on Computer Vision and Pattern Recognition (CVPR '99), pp. 2246-2252, 1999.

Makarov et al., "Intrusion detection using extraction of moving edges", in $12^{th}$ IAPR Int. Conf. on Pattern Recognition, vol. 1 of IAPR, pp. 804-807, IEEE Press, 1994.

Paragious et al., "Detection and location of moving objects using deterministic relaxation algorithms", in ICPR, No. 13, pp. 201-286, Vienna, Austria, Aug. 1996.

http://www.alibaba.com/product-gs/373281312/Ultrasonic_Parking_Sensor.html, retrieved from the internet Mar. 28, 2012; 4 pgs.

Oliver et al., "A Bayesian Computer Vision System for Modeling Human Interactions", IEEE Transactions on PAMI, pp. 831-843, (Mar. 28, 2000).

Lo et al., "Automatic congestion detection system for underground platforms,"Proc. of 2001 Int Symp. on Intell. Multimedia, Video and Speech Processing, pp. 158-161.

Prati et al., "Shadow Detection Algorithms for Traffic Flow Analysis: a Comparative Study", In Proc. IEEE Intelligent Transportation Systems, 2001.

Cucchiara et al., "Improving Shadow Suppression in Moving Object Detection with HSV Color Information", Proc. of IEEE Intelligent Transportation Systems, 2001.

Zhang, "A flexible new technique for camera calibration", IEEE Trans. on Pattern Analysis and Machine Intelligence, vol. 22 (11), pp. 1330-1334 (2000).

http://www.nyc.gov/html/dof/html/parking/park_tickets_violations.shtml, retrieved from the internet Aug. 6, 2012.

http://www.sanjoseca.gov/transportation/onstreet_regulations.htm, retrieved from the internet Aug. 6, 2012.

http://www.portlandoregon.gov/transportation/article/59926, retrieved from the internet Aug. 6, 2012.

http://vancouver.ca/bylaws/2849c.pdf, Street and Traffic By-Law No. 2849, Oct. 18, 2011.

http://parkitnyc.com/parking-nyc/nyc-parking-tickets/, retrieved from the internet Aug. 6, 2012.

Agarwal et al., "Learning to detect objects in images via a sparse, part-based representation", Pattern Analysis and Machine Intelligence, IEEE Transactions on, vol. 26, No. 11, pp. 1475-1490, Nov. 2004.

Tsai et al., "Vehicle Detection Using Normalized Color and Edge Map," Image Processing, IEEE Transactions on, vol. 16, No. 3, pp. 850-864, Mar. 2007.

Duncan, et al., "Temporal edges: The detection of motion and the computation of optical flow", in Proc. Second Int. Conf. Comput. Vision, Tampa, FL, Dec. 1988, pp. 374-382.

Comaniciu et al., "Real-time tracking of non-rigid objects using mean shift", in: Proceedings of IEEE Conference on Computer Vision and Pattern Recognition (CVPR'00), South Carolina, 2000, pp. 142-149.

Kass et al., "Snakes: Active Contour Models", Int'l Journal of Computer Vision, pp. 321,331, 1988.

Dickmanns et al., "Dynamic monocular machine vision", Machine Vision and Applications 1: 1223-240, 1988.

Gustafsson et al., "Particle Filters for Positioning, Navigation and Tracking", IEEE Transactions on Signal Processing, 2002.

http://en.wikipedia.org/wiki/Hough_transform, "Hough transform", retrieved from the internet Aug. 6, 2012, last modified Aug. 1, 2012.

Ma et al., "Edge-based rich representation for vehicle classification", Proc. of IEEE Computer Vision (ICCV), 2005.

\* cited by examiner

VIDEO-BASED SYSTEM AND METHOD FOR DETECTING EXCLUSION ZONE INFRACTIONS

CROSS REFERENCE TO RELATED PATENTS AND APPLICATIONS

This application is related to co-pending Application Number, filed herewith, entitled "Video-Based Detector and Notifier For Short-Term Parking Violation Enforcement", by Edgar Bernal et al.; and co-pending Application Number, filed herewith, entitled "A System and Method for Available Parking Space Estimation for Multispace On-Street Parking", by Orhan Bulan et al., each of which is incorporated herein in their entireties.

BACKGROUND

The present disclosure relates to a system and method for determining exclusion zone violations by detecting vehicles that are parked in an area that regulates and/or prohibits parking. However, it is appreciated that the present exemplary embodiments are also amendable to other like applications.

Municipalities regulate parking in certain areas for public safety and ease of access reasons. Areas that prohibit vehicles from parking, standing, and/or stopping are denoted as exclusion zones. Common examples of exclusion zones include, but are not limited to, specified vicinities that are proximate a fire hydrant, a sidewalk, a crosswalk, a road sign, a private road or driveway, a corner, a garbage container, and a driving lane, etc. A short term or limited hour parking zone is another example of exclusion zone in the sense that a violation occurs in the zone when parking exceeds the posted parking time limit.

Infractions of exclusion zone regulations are among the most commonly occurring parking violation. In some larger municipalities, about one-third of infractions can occur in exclusion zones. These infractions can result in substantial fines for the violators. Payment of these fines can generate significant revenue, into the millions, for municipalities.

Traditionally, a detection of exclusion zone infractions is performed by traffic law enforcement officers. However, this method is costly in labor and can result in lost revenues when infractions go undetected by the officers. In an effort to reduce costs and improve efficiency, municipalities are exploring the use of new technologies for automating traffic law enforcement.

One technology that has been used to automate traffic management includes in-ground sensors. Conventional sensor-based methods have been used to automate a detection of vehicles in parking spaces. For example, "puck-style" sensors and ultrasonic ceiling or in-ground sensors output a binary signal when a vehicle is detected in a parking area. The detected information is wirelessly communicated to authorities. One disadvantage associated with these sensor-based methods is a high cost for installation and maintenance of the sensors. In addition, the maintenance or replacement of a sensor may reduce parking efficiency if a parking space is made unavailable for the service work. Furthermore, many parking violations, such as double parking, cannot be detected through the use of in-ground sensors.

Video-based technology is being explored in other parking enforcement and management areas, such as for monitoring short term parking spaces that were traditionally metered and for determining parking space availability based on vehicle occupancy. The video-based sensing is much more extensible to additional functions as compared to in-ground metal sensors or ultra-sonic sensors. However, video-based technology has not been extended to a use of monitoring exclusion zones for enforcing parking regulations.

There is a need for a system and a method that uses video data received by a video-sensor for determining an occurrence of a violation. In this manner, the disclosure described herein can also increase revenue for municipalities by reducing an occurrence of missed fines and the costs of labor associated with detecting parking infractions.

BRIEF DESCRIPTION

A first embodiment of the present disclosure is directed toward a method for determining a parking violation. The method includes receiving video data as a sequence of frames provided by an image capture device. The method further includes defining a location of an exclusion zone in the video data. The method also includes detecting a vehicle located in the defined exclusion zone. The detecting includes determining a background in an initial frame of the video data and determining a background in a select frame by applying a predetermined updating process. The detecting also includes subtracting the background of the select frame from the select frame to obtain an image difference. The detecting further includes classifying the pixels in the image difference as foreground or background pixels and classifying the pixels in the foreground image as vehicle or non-vehicle pixels. The method includes determining a duration that the detected vehicle is in the exclusion zone based on a number of the sequence of frames including the detected vehicle.

Another embodiment of the present disclosure is directed toward a system for determining a parking violation. The system includes a parking violation determination device in communication with an associated image capture device adapted to monitor an exclusion zone over duration of time. The parking violation determination device includes a video capture module that is adapted to receive video data from the associated image capture device and corresponding to a sequence of frames each capturing the exclusion zone; an exclusion zone detection module that is adapted to define a location of the exclusion zone in the video data; and a vehicle detection module that is adapted to detect a vehicle located in the defined exclusion zone. The vehicle detection module is adapted to determine a background in an initial frame of the video data; determine a background in a select frame by applying a predetermined updating process; subtract the background of the select frame from the select frame to obtain an image difference; classify pixels in the image difference as belonging to foreground or background pixels, and classify the pixels in the foreground image as vehicle or non-vehicle pixels. The parking violation determination device also includes a duration determination module that is adapted to determine a duration that a vehicle is in the exclusion zone based on a number of the sequence of frames including the vehicle pixels. A processor is adapted to implement the modules.

DETAILED DESCRIPTION

Figure 1:
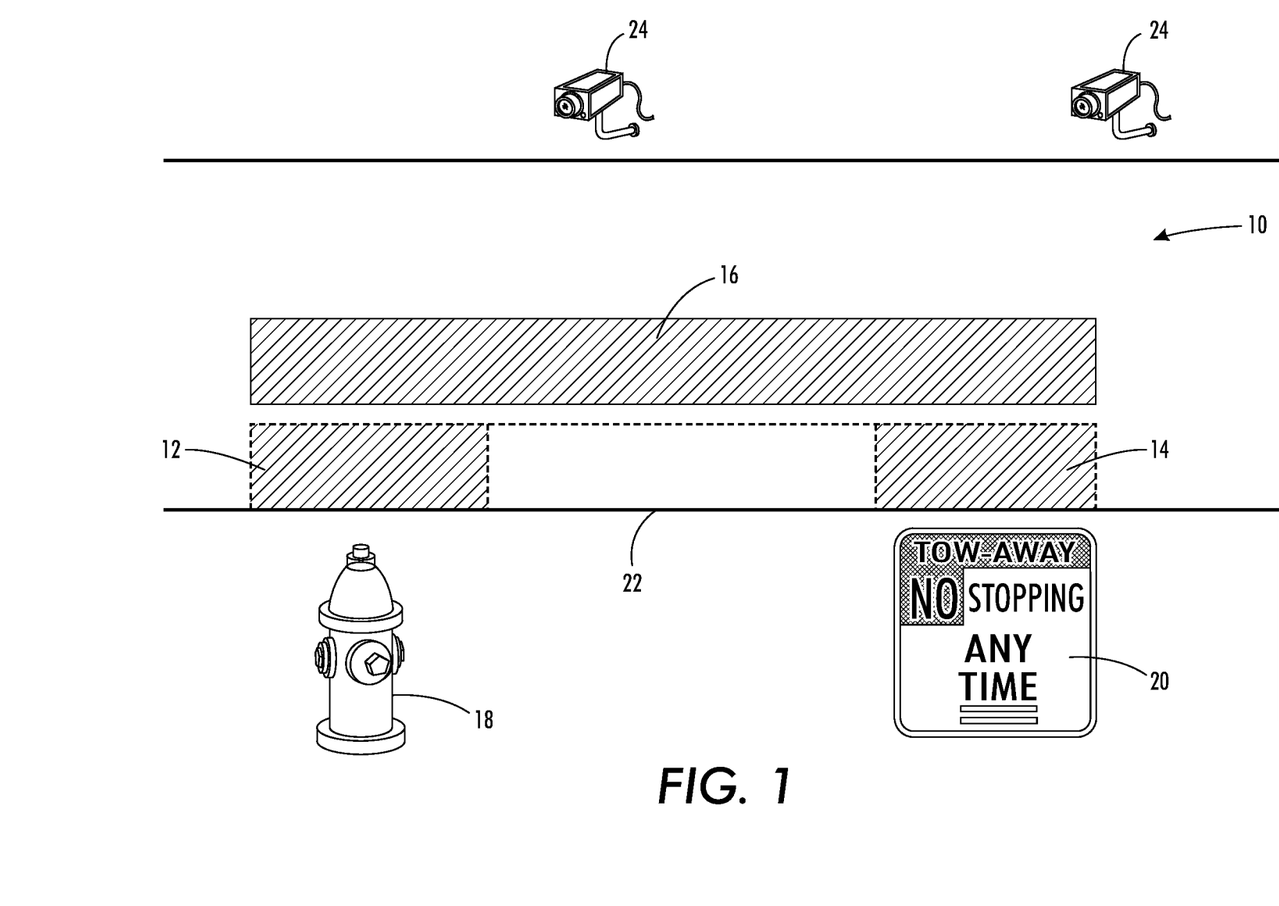
FIG. 1 is an example scenario where the present disclosure can be applied to determine exclusion zone infractions.

The present disclosure relates to a system and method for determining exclusion zone violations by detecting vehicles that are parked or stopped or standing (hereinafter collectively referred to as "parked") in an area that regulates and/or prohibits parking. In one embodiment, the system includes a video camera that monitors an area including an exclusion zone. The system processes the video data using embedded camera hardware or at a central processor. FIG. 1 is an example scenario where the present disclosure can be applied to determine exclusion zone infractions. An area 10 along a street includes three examples of exclusion zones 12, 14, 16 where parking is prohibited. The first exclusion zone 12 corresponds to a region in a vicinity of a fire hydrant 18. The second exclusion zone 14 includes a region that is demarked by a sign 20, which indicates that stopping is prohibited at all times. The third exclusion zone 16 is located along the street where double parking occurs, which is defined as a vehicle that parks outside of and next to a vehicle that is already parked alongside the curb 22. Video cameras 24 are installed across the street for continuously monitoring the area 10. The cameras detect infractions of parking regulations in these exclusion zones, which can result in substantial fines issued to the violators.

Figure 2:
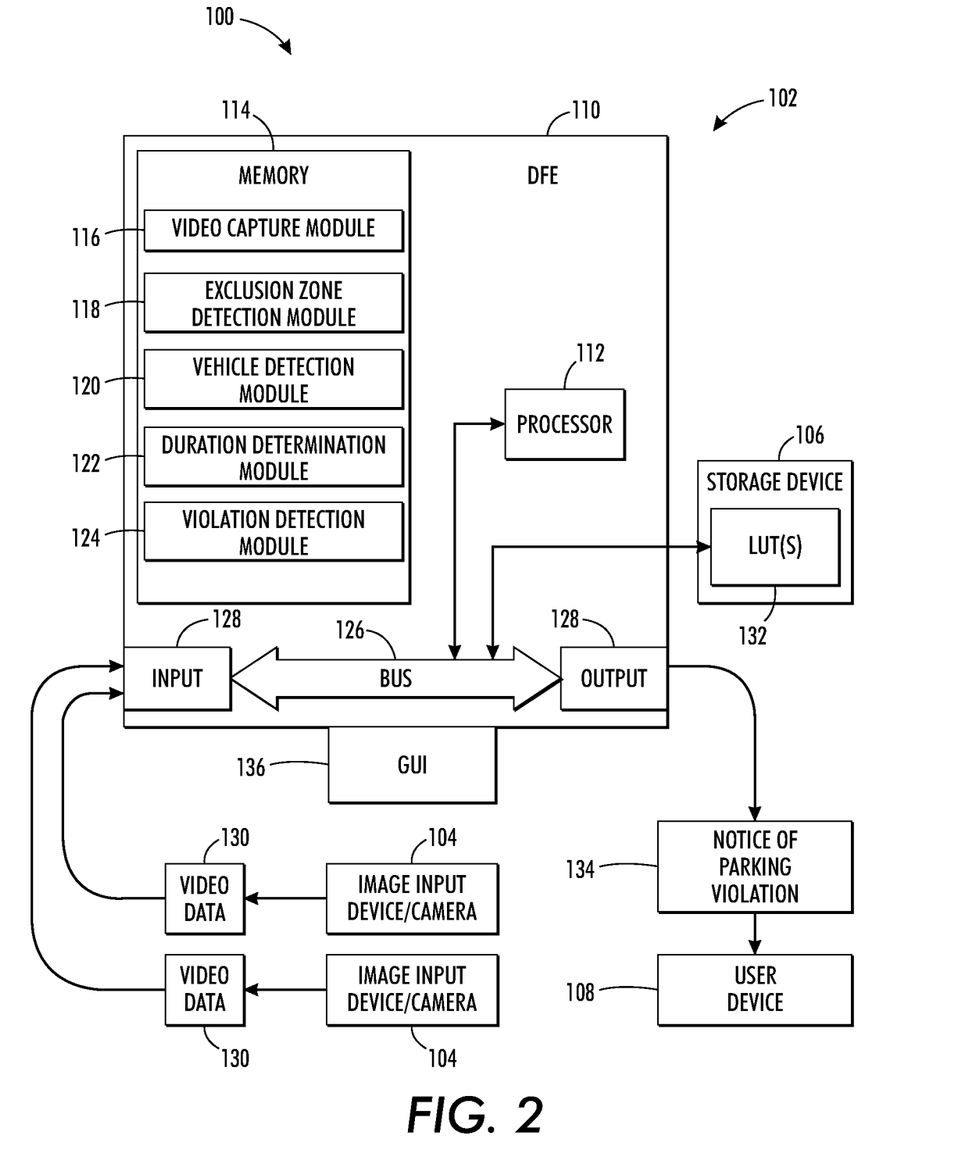
FIG. 2 is a schematic illustration of a exclusion zone violation determination system according to one embodiment.

FIG. 2 is a schematic illustration of an exclusion zone violation determination system 100 in one exemplary embodiment. The system includes a determination device 102, an image capture device 104, and a storage device 106, which may be linked together by communication links, referred to herein as a network. In one embodiment, the system 100 may be in further communication with a user device 108. These components are described in greater detail below.

The determination device 102 illustrated in FIG. 2 includes a controller 110 that is part of or associated with the determination device 102. The exemplary controller 110 is adapted for controlling an analysis of video data received by the system 100 by classifying the pixels in each static frame. The controller 110 includes a processor 112, which controls the overall operation of the determination device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 102, executes instructions stored in memory 114 for performing the parts of the method outlined in FIGS. 3 and 4. In some embodiments, the processor 112 and memory 114 may be combined in a single chip.

The determination device 102 may be embodied in a networked device, such as the image capture device 104, although it is also contemplated that the determination device 102 may be located elsewhere on a network to which the system 100 is connected, such as on a central server, a networked computer, or the like, or distributed throughout the network or otherwise accessible thereto. The video detection and exclusion zone violation determination phases disclosed herein are performed by the processor 112 according to the instructions contained in the memory 114. In particular, the memory 114 stores a video capture module 116, which receives captured video that monitors an area of interest; an exclusion zone detection module 118, which defines a location of at least one exclusion zone in the captured video data; a vehicle detection module 120, which detects vehicles in the defined exclusion zone(s); a duration determination module 122, which determines a duration that a detected vehicle stays in the exclusion zone and whether, based on the duration, a violation has occurred; and, a violation detection module 124, which determines whether the detected vehicle meets other violation conditions related to the exclusion zone regulation. Embodiments are contemplated wherein these instructions can be stored in a single module or as multiple modules embodied in the different devices. The modules 116-124 will be later described with reference to the exemplary method.

The software modules as used herein, are intended to encompass any collection or set of instructions executable by the determination device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the determination device 102 may be all connected by a bus 126.

With continued reference to FIG. 2, the determination device 102 also includes one or more communication interfaces 128, such as network interfaces, for communicating with external devices. The communication interfaces 128 may include, for example, a modem, a router, a cable, and/or Ethernet port, etc. The communication interfaces 128 are adapted to receive video and/or image data 130 as input.

The determination device 102 may include one or more special purpose or general purpose computing devices, such as a server computer or digital front end (DFE), or any other computing device capable of executing instructions for performing the exemplary method.

FIG. 2 further illustrates the determination device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from the parking area of interest. The number of cameras may vary depending on a length and location of the area being monitored. It is contemplated that the combined field of view of multiple cameras typically comprehends all exclusion zones. For performing the method at night in parking areas without external sources of illumination, the cameras 104 can include near infrared (NIR) capabilities at the low-end portion of a near-infrared spectrum (700 nm-1000 nm).

In one embodiment, the image source 104 can be a device adapted to relay and/or transmit the video captured by the camera to the determination device 102. In another embodiment, the video data 130 may be input from any suitable source, such as a workstation, a database, a memory storage device, such as a disk, or the like. The image source 104 is in communication with the controller 110 containing the processor 112 and memories 114.

With continued reference to FIG. 2, the system 100 includes a storage device 106 that is part of or in communication with the determination device 102. In a contemplated embodiment, the determination device 102 can be in communication with a server (not shown) that includes a processing device and memory, such as storage device 106, or has access to a storage device 106, for storing look-up tables (LUTs) that associate an exclusion zone with parking/standing/stopping conditions and durations particular to the exclusion zone. Another LUT stored in the storage device maps numbers of frames to actual durations based on the frame rate of the received video. The storage device 106 includes a repository 132, which stores at least one (previously generated) LUT for each particular camera used by the system 100.

With continued reference to FIG. 2, the video data 130 undergoes processing by the determination device 102 to output notice of an exclusion zone parking violation 134 to an operator in a suitable form on a graphic user interface (GUI) 136 or to a user device 108, such as a smart phone belonging to a driver in transit or to vehicle computer and/or GPS system, that is in communication with the determination device 102. The GUI 136 can include a display, for displaying information, such as the location of the infraction and information regarding the vehicle violating the infraction, to users, and a user input device, such as a keyboard or touch or writable screen, for receiving instructions as input, and/or a cursor control device, such as a mouse, trackball, or the like, for communicating user input information and command selections to the processor 112.

Figure 3:
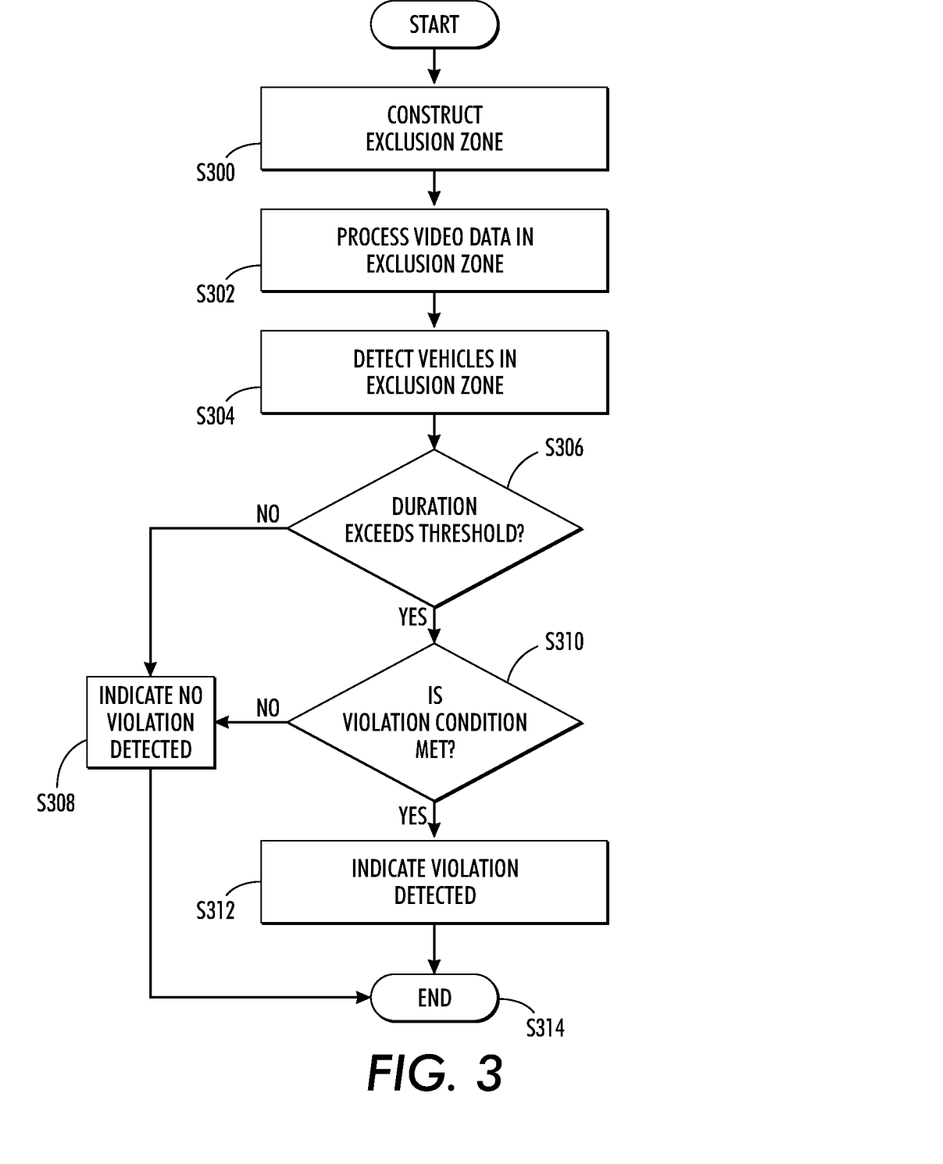
FIG. 3 is a flowchart describing an overview of a method for determining exclusion zone violations according to the present disclosure.

FIG. 3 is a flowchart describing an overview of a method for determining exclusion zone violations. As mentioned, a video camera captures an area of interest. The camera can be calibrated at the time of installation, or at a start of the video sequence, to associate three dimensional coordinates at the actual area to pixel coordinates in the video data. These coordinates can be used to construct the exclusion zone at S300. The video data corresponding to the exclusion zone is processed at S302. Vehicles located in the defined exclusion zone are detected at S304. In response to a vehicle being detected, a duration that the vehicle is stationary in the exclusion zone is computed. The duration is then compared to a threshold at S306. The threshold is based on the regulation associated with the particular exclusion zone. No violation occurs at S308 when the duration does not meet the threshold. However, in response to the duration meeting or exceeding the threshold, the system checks to determine whether another condition related to the exclusion zone regulation is met at S310. Again, no violation occurs at S308 if the condition is not met. However, a violation is detected at S312 when a violation condition is met. The detected violation is reported to entities that are authorized to enforce the regulation.

Figure 4A:
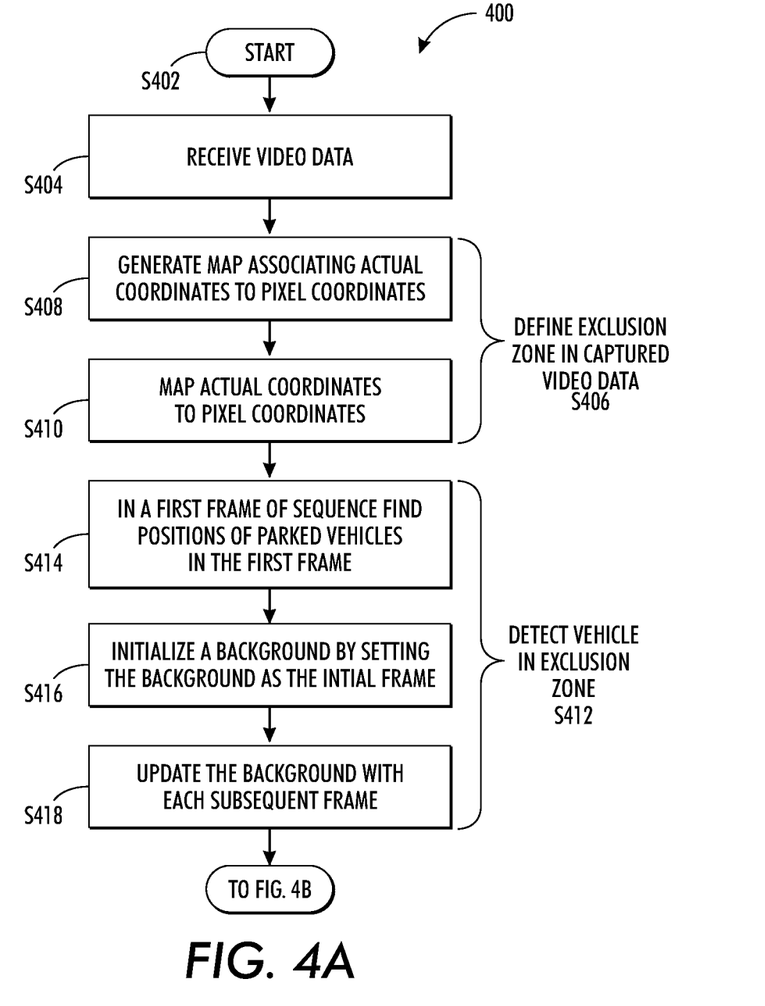
FIG. 4 is a flowchart describing a detailed method for determining exclusion zone violations.
Figure 4B:
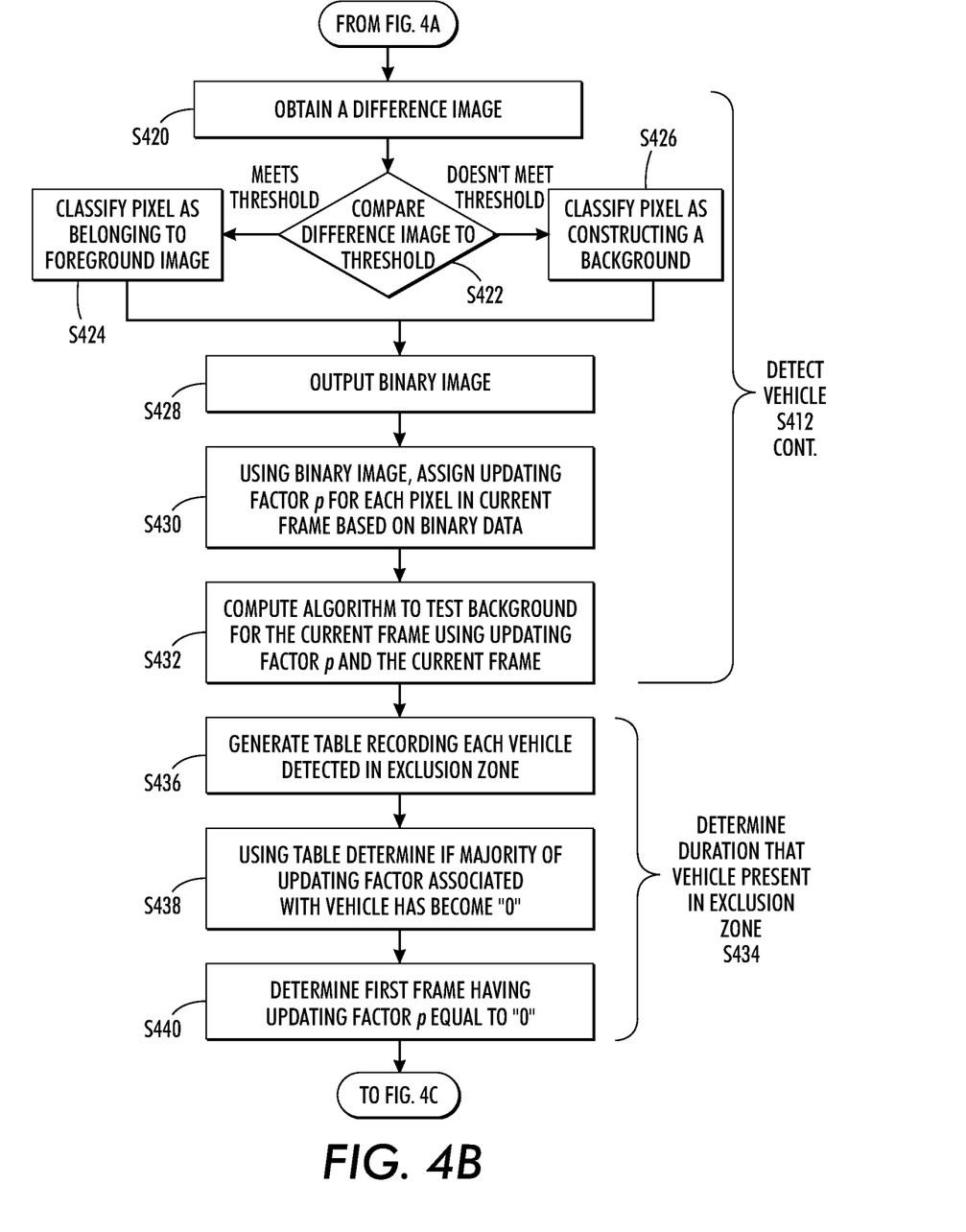
Figure 4C:
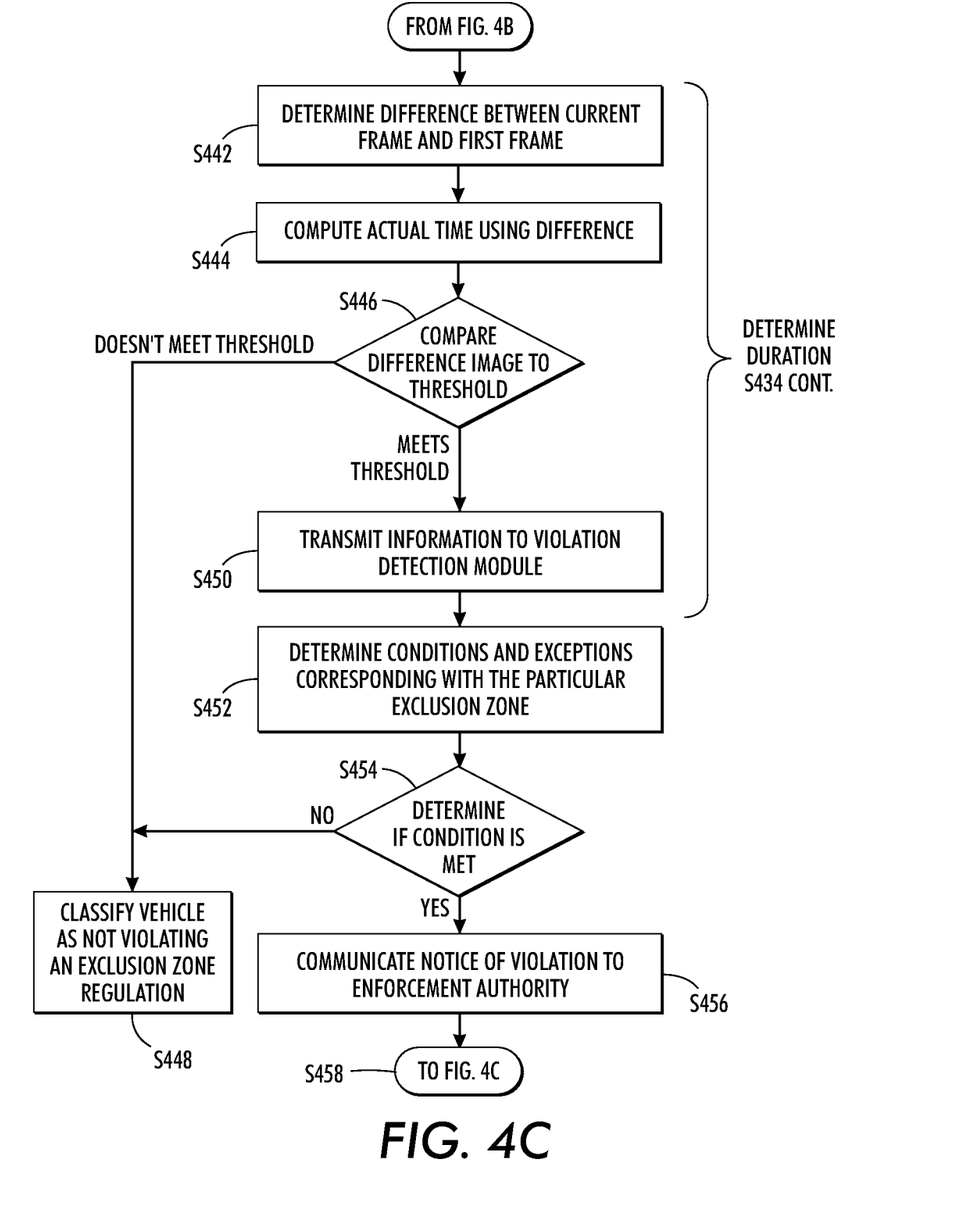

FIG. 4 is a flowchart describing a detailed method 400 for determining exclusion zone violations. The method 400 starts at S402. The video capture module 116 receives video data from a sequence of frames taken from the image capture device 104 monitoring a parking area at S404. The video capture module 116 transmits the video data to the exclusion zone detection module 118.

Figure 5A:
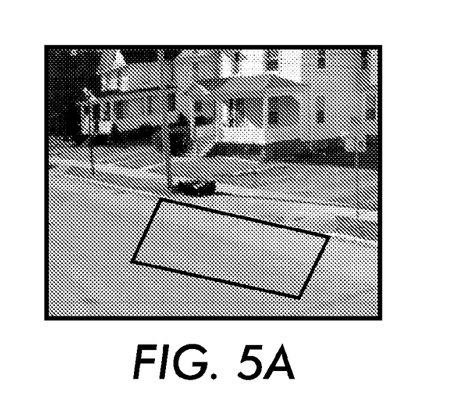
FIGS. 5A-5C show three examples of exclusion zones that are defined in respective frames of video data.
Figure 5B:
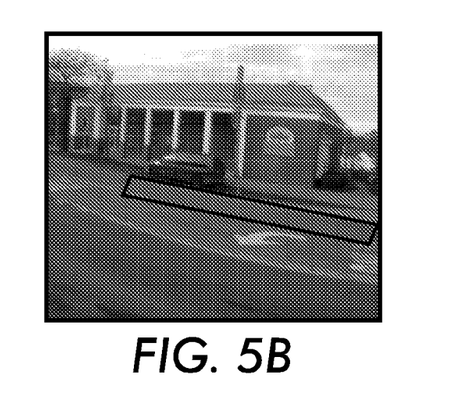
Figure 5C:
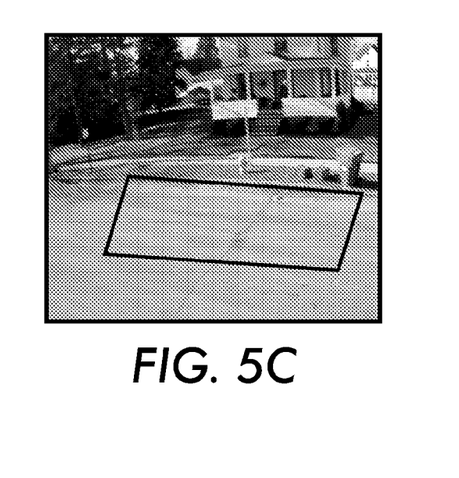

The exclusion zone in the captured video is defined on the image plane at S406. The exclusion zone can be defined at the time the camera is installed or at a time when the camera is calibrated, such as, for example, at the start of a video sequence. FIGS. 5A-5C show three examples of exclusion zones that are defined in video data of respective frames. FIG. 5A shows an exclusion zone that is delimited by a bounding box in front of a private driveway. FIG. 5B shows an exclusion zone that corresponds to a portion of road that is adjacent to an on-street parking area where double parking can occur. FIG. 5C shows an exclusion zone that is delimited by a bounding box in front of a fire hydrant.

Many municipalities specify exclusion zones in terms of an actual distance to a specific location or object. For example, a parking regulation may define an exclusion zone as being a certain number of feet from a fire hydrant or a railroad crossing. The exclusion zone detection module precisely defines the exclusion zone in the video data based on the regulation. Namely, the exclusion zone can be defined by generating a map associating three-dimensional coordinates in the actual area to two-dimensional pixel coordinates of the parking area in the video data at S408. The exclusion zone can be defined in the initial frame of the video data by mapping the actual coordinates to pixel coordinates at S410.

More specifically, the exclusion zone detection module can determine actual coordinates (x,y,z) of a reference object, such as, for example, the fire hydrant in FIG. 5C. The module can then access the LUT that is stored in the storage device to determine the actual distance from the reference object that includes the exclusion zone based on the traffic law and/or regulation. The actual distance is mapped to a pixel distance using an LUT that was segmented at S408. In one embodiment, the actual coordinates are determined along a boundary of the actual exclusion zone by computing a perimeter on the road surface extending around the reference object at the regulated distance. The actual coordinates along the boundary are mapped to the pixel coordinates (u, v) in the video data. A bounding box can be created through the pixel coordinates to define the exclusion zone in the video data.

In another embodiment, the system 400 can receive input (manually) designating the parking area in the video data with a boundary, such as, for example, a colored boundary.

Continuing with FIG. 4, the vehicle detection module 120 detects vehicles in the exclusion zone at S412. The vehicle detection module 120 performs a process for analyzing each frame in the sequence and then it detects vehicles based on the difference between two frames. More specifically, the vehicle detection module 120 determines positions of parked vehicles in a first frame of the sequence at S414. In one embodiment, the vehicle detection module 120 can perform a process on the sequence when a first frame is available having an image of the background without any foreground objects. However, the vehicle detection module 120 can perform an initialization process when there is a foreground object, such as a parked vehicle, in the image at the start of the video feed. After the parked vehicles are determined at S414, the background is initialized by setting the background as the initial frame at S416. The background is updated with each subsequent frame at S418. The subsequent frame is compared to the background of the selected frame to obtain an image difference at S420. In this manner, the vehicle detection module 120 can perform a process of background removal on the subsequent frame by computing an absolute difference in intensity between pixels located in the background of the selected frame and pixels located at corresponding locations in the subsequent frame. The difference between the images can be compared to a threshold at S422. In response to the difference exceeding the threshold, the pixel can be classified as a foreground image in the selected frame at S424. In response to the difference falling below the threshold, the pixel can be classified as constructing a background image at S426.

The vehicle detection module 120 can perform further processing on the foreground pixels in the selected frame to determine if the pixels belong to one of a vehicle and a non-vehicle. In one embodiment, the processing can include occlusion detection. In another embodiment, the processing can include shadow suppression. There is no limitation made herein directed toward the type of processing that can be performed for classifying the foreground pixels. One example of processing can include occlusion detection, which is described in co-pending application, the teachings of which are fully incorporated herein.

The vehicle detection module 120 generates a binary image of the background at S428. Namely, the vehicle detection module 120 assigns "0" values to the pixels classified as belonging to the foreground image and "1" values to pixels classified as belonging to the background construct. Using the binary data, the vehicle detection module 120 assigns an updating factor p to each pixel for computing a background in the next frame at S430.

More specifically, at S430 the vehicle detection module 120 is used to update the background in each next frame in the sequence, which is also referred to herein as the most current frame, by applying an updating factor p that is assigned to each pixel based on the classification made for pixels of corresponding locations in the preceding frame.

One aspect of the present disclosure is that the updating factor p varies depending on the classification assigned to the pixel as belonging to the foreground and background image in the preceding frame. With continued reference to FIG. 4, the selection of the updating factor p is particularly suited for detecting vehicles that are parking in and/or moving away from the exclusion zone during the time period that the sequence of frames is captured, i.e., during the video feed. In one embodiment, the following criteria can be used to set the learning parameter for each pixel at each time instant. The updating factor p can be assigned a "0" value for a pixel indexed by (i, j) if the classification indicates that a vehicle is captured in the initial or preceding frame. In this manner, the updating factor p is "0" for any pixel belonging to a parked vehicle, a determined occlusion, or a detected movement in the exclusion zone in the select frame. Pixels belonging to background construct at S426 do not get updated for corresponding locations in the sequence under these conditions. The updating factor p can be assigned a "1" value for a pixel indexed by (i, j) in frames that no longer include a previously stationary vehicle. In other words, the updating factor p is "1" when a parked vehicle in a previous frame has left the parking area in a current frame. Accordingly, the background is recovered immediately by setting the updating factor to "1" for pixels at the location previously occupied by the vehicle. For all other pixels, the updating factor p is set to a value between zero and one (0≤p≤1) to update the background gradually. In one contemplated embodiment, the value can be set to 0.01.

One aspect of the disclosure is that the system applies a learning element to the updating factor p and uses the updating factor p as input when computing an algorithm used for estimating a background of a current frame at S432. As mentioned, in this algorithm the background is initialized as the initial frame in the sequence of frames and gradually updates with each next frame in the sequence. The algorithm is represented by the equation:

$$B_{t+1} = p*F_{t+1} + (1-p)*B_t$$

where $B_t$ represents the background at time t;
$F_{t+1}$ is the select frame at time t+1; and,
$0 \leq p \leq 1$ is the image updating factor Based on the above-mentioned values for the updating factor p assigned to each pixel, if the updating factor p is "1" for all pixels in a frame, then the estimated background at any given time is equal to the current frame. If the updating factor p is selected as "0", the background remains the same as the background at time t. In other words, the updating factor p controls the updating rate of the background, with larger values of p contributing to faster upgrade rates. The vehicle detection module 120 transmits the updating rate to the duration determination module 122.

There is no limitation made herein to a technique that can be used for updating the background estimate. There are several known algorithms that can be used as alternatives for estimating a background, such as, for example, algorithms based on Gaussian Mixture Models and Running Average Filter. Other methods that are understood in the art can be used for detecting vehicles captured in still images, such as, analyzing common texture, structure, color, and other features that are commonly associated with images of vehicles.

Figure 6:
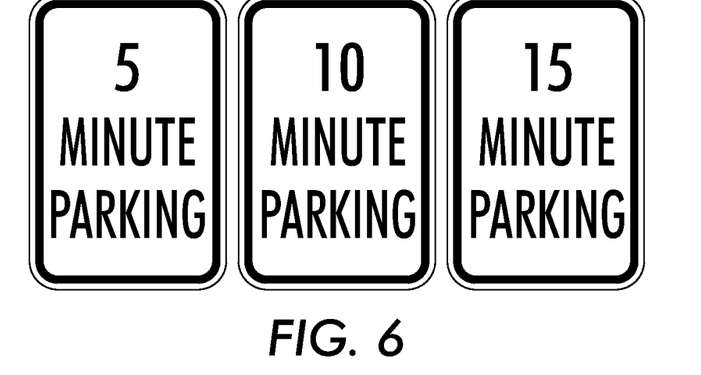
FIG. 6 shows example signs allowing parking in an exclusion zone.

With continued reference to FIG. 4, duration determination module 122 uses the updating factor p of the background to determine a duration that a vehicle is present in the exclusion zone at S434. Specifically, the duration that a given vehicle remains parked at an exclusion zone is given by the number of frames across which the p factor maintains a value of "0" for the vehicle pixels divided by the frame rate of the received video. Generally, a traffic regulation can completely prohibit parking or it can permit parking for a limited period of time in an exclusion zone. The duration can vary based on the type of exclusion zone. For example, traffic laws prohibit any parking in front of all fire hydrants. However, municipalities can permit some parking by regulating traffic flow during certain times of days, or in front of certain structures, using signs. FIG. 6 shows example signs allowing parking in an exclusion zone. The signs indicate the amount of time that a vehicle is permitted to park in an exclusion zone.

As mentioned, the updating factor p is set to "0" when a foreground As mentioned, the updating factor p is set to "0" when a foreground is detected at a specific position on the image plane. In other words, the updating factor p is set to "0" for the pixels belonging to a detected vehicle in the exclusion zone. These pixels do not update in the background, which is estimated for each subsequent frame using the algorithm, as long as the detected vehicle remains stationary in the exclusion area.

Using the backgrounds determined for each frame tested at S432, the duration determination module 122 determines the duration that a vehicle is in the exclusion zone by computing, from a current frame, a number of (preceding, consecutive) frames in the sequence that the vehicle is stationary. The duration determination module 122 generates a table that records the "starting time" for each vehicle that is detected in the exclusion zone at S436. The table charts a pixel coordinate information over time (i.e., a sequence of frames) for a select pixel (i,j) belonging to the vehicle. The entry for the vehicle is deleted when the vehicle leaves the exclusion zone. To determine this occurrence, the vehicle is checked in each frame by examining if the majority of the updating factor value p(i, j) associated with the vehicle has become "0" at S438. In one embodiment, a filter can be applied to the chart to cancel out any noise that is affecting the results.

Using the table, the duration determination module 122 determines a first frame having an updating factor p being equal to "0" at S440. In the table, this frame is indicated at a point where the plot levels off. A number of consecutive frames are determined that follow the first frame having the updating factor being equal to "0" for pixels located at corresponding locations to the first frame. This number is determined as the number of frames that the plot remains level in the table. The system associates the first frame as a start frame and the number of frames as a period that the vehicle remains in the exclusion zone. Generally, the system is determining a time that a vehicle is stationary using a current frame. In this manner, the number of frames can also be determined by computing a difference between the current frame and the start frame at S442.

The number of frames is converted to an actual duration at S444. The duration is obtained by referring to an LUT that associates the number of frames (or the difference value) to an actual time taking into account the frame rate of the received video. The duration is compared to a predetermined threshold at S446. This threshold is based on the type of exclusion zone. The system can obtain the threshold information by referring to an LUT that associates a traffic regulation with the particular exclusion zone that is being monitored. The threshold is based on the regulation.

In response to the duration not exceeding the threshold, the system determines that the vehicle is not violating an exclusion zone regulation at S448. In response to the duration exceeding the threshold, the system determines that the vehicle may be violating an exclusion zone regulation and transmits the information to the violation detection module 124 at S450.

Figure 7:
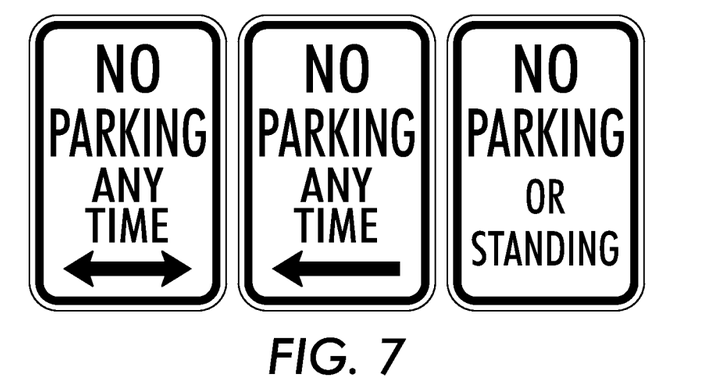
FIG. 7 shows example regulations prohibiting parking/standing in an exclusion zone.

The violation detection module 124 checks the traffic regulation to determine if other violation conditions are being met by the vehicle that is detected in the exclusion zone. As mentioned, the conditions typically depend on the type of exclusion zone. The restrictions for various exclusion zones can be different. FIG. 7 shows examples of regulations that prohibit parking in an exclusion zone under different conditions. For example, some exclusion zones prohibit parking and standing vehicles from being in the zone. However, other exclusion zones prohibit parking, but may allow standing to occur in the zone. Standing generally includes temporary parking, wherein a driver does not leave the vehicle unattended. The vehicle may be standing in an exclusion zone to load and unload items and/or passengers. Standing is generally permitted in commercial loading zones and in passenger pick-up lanes (such as at airports). However, parking in these same areas is prohibited. In another scenario, parking may be prohibited only on specific days or during specific times. For example, parking lanes may be available for vehicles parked in a city between the hours of 10:00 a.m. and 4:00 p.m. and between 6:30 p.m. and 8:00 a.m. However, these parking lanes might be converted into driving lanes that are designated for traffic in-flow and out-flow during rush-hours.

Furthermore, based on the traffic laws of various municipalities, several exceptions can cause a vehicle to not violate an exclusion zone regulation if it is parked in the zone for certain reasons. For example, a vehicle is not found to be parked if its movement is being obstructed, such as, for example, by another vehicle positioned in front of it, if it is waiting to enter and/or leave a gate booth lane, and if the vehicle is in obedience to the direction of a traffic control officer.

One aspect of the present disclosure is that it provides a system and a method that is adapted to analyze the conditions for positively determining whether an exclusion zone violation is occurring. The violation detection module 124 checks the regulation specific to the exclusion zone to determine whether the detected vehicle meets other violation conditions at S452. For example, the module 124 can access an LUT in the storage device that associates particular regulation conditions for each exclusion zone area. The module 124 can map the specific coordinates of the exclusion zone to the regulation corresponding to the zone. The LUT can provide the violation detection module with a time limit for allowable parking, information regarding standing and/or parking conditions, and information on exceptions.

After the violation detection module 124 receives the conditions, it determines whether the vehicle satisfies any of the conditions at S454. For example, if a condition allows for standing vehicles, but prohibits parked vehicles, the module 124 detects whether the vehicle is standing. To determine whether a vehicle is standing in one embodiment, the same or a different image capture device can detect a driver at a windshield region of the vehicle. The module 124 can determine if a driver and/or passenger is within the vehicle using any technique known in the art, such as, for example, the process used for determining occupancy in high-occupancy vehicle (HOV) or car-pools lanes. In this manner, a single-band or a multiband camera can be used. Alternatively, the system can determine whether a person can be detected proximate to and/or stepping into and/or out of the vehicle using a known human detection algorithm in the area where the vehicle is detected.

In the case of determining other exceptions, the violation detection module 124 can determine whether the vehicle is obstructed from movement. One example of an obstruction can include traffic congestion caused by a traffic light situated beyond the exclusion zone. In one embodiment, the system can detect other vehicles and/or foreground images that are situated near the vehicle. In one embodiment including a double-parking scenario, the exclusion zone can be defined to extend to a traffic light. The system can detect whether a second vehicle is stationary in front of (i.e., in the direction of traffic) the double-parked vehicle for the duration. In response to the second vehicle meeting the duration, the system can determine to not trigger a violation at S448. In response to the second vehicle not meeting the duration, the system can perform the process described above on all detected vehicles (in the direction of traffic) as being parked all the way up to the traffic light. In response to a detected vehicle not meeting the duration, the system can trigger the violation warning.

In response to a condition being met, the system can output the exclusion zone violation information to a user device at S456. Once a violation is detected, the information can be sent to entities authorized to take action, such as law enforcement, for checking the scene, issuing a ticket, and/or towing the vehicle. In one embodiment, the information can be transmitted to an enforcement officer for a municipality that subscribes to the service and/or is determined via GPS data to be within a region proximate the exclusion zone. In another embodiment, the information can be transmitted in response to a user-device querying the system for the information. The information can indicate the location of the exclusion zone, the vehicle description and the license plate number of the vehicle that is violating the regulation. The method ends at S458.

Although the method 400 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

EXAMPLE IMPLEMENTATION

The performance of the algorithm described in the present disclosure was tested on three different exclusion zones. The exclusion zones were located in front of a fire hydrant, in front of a private driveway, and along an outer, roadway side of a vehicle parked at a curb. Parking, with a minimum stop time, is prohibited in all of the test exclusion zones. A video sequence was captured for each of the exclusion zones where an infraction of the regulation occurred. The videos were taken with a commercially available Vivotek IP8352 surveillance camera. The captured video had a frame rate of 30 frames per second (fps) and a resolution of 1280×1024. In order to enable faster processing, the frame rate was decreased by a factor of 6 and frames were spatially subsampled by a factor of 4 along the vertical and horizontal directions. Consequently, after this spatio-temporal decimation, the video sequence had a frame of 5 fps and a resolution of 320×256 pixels.

The exclusion zone was manually defined in the captured video for each of the videos. The algorithm was initialized by setting the first frame as the background. The algorithm was computed to gradually update the background and detect vehicles in the exclusion zone.

When a foreground blob was detected, a shadow suppression algorithm was performed on the video data to remove shadow from the detected blob. Once the vehicle was detected, the system estimated the duration that the vehicle stayed in the exclusion area and filtered out the vehicles just passing by the exclusion area.

Figure 8:
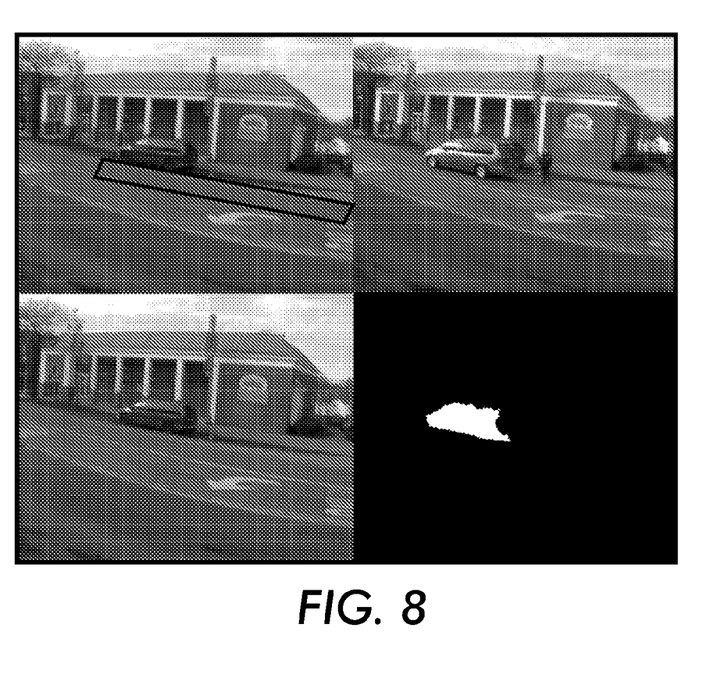
FIGS. 8-10 show results of an example implementation of the present disclosure.

FIG. 8 shows results of an example implementation of the present disclosure for the exclusion zone located in the double-parking (i.e., driving) lane extending along the outside of an on-street parking area. To detect the double parking violation, the system determined a duration that a detected vehicle was stationary in the exclusion zone to eliminate any vehicles that were waiting for traffic lights due to congestion caused by traffic lights.

Figure 9:
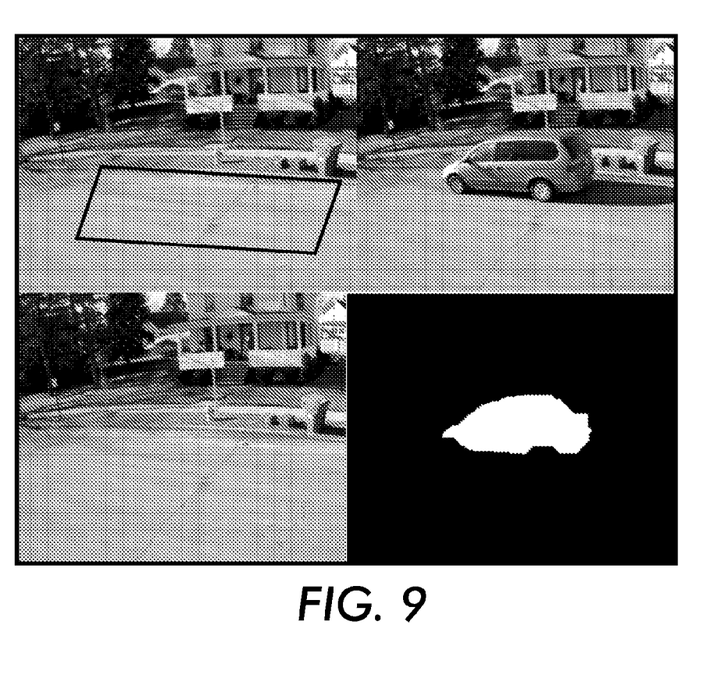
Figure 10:
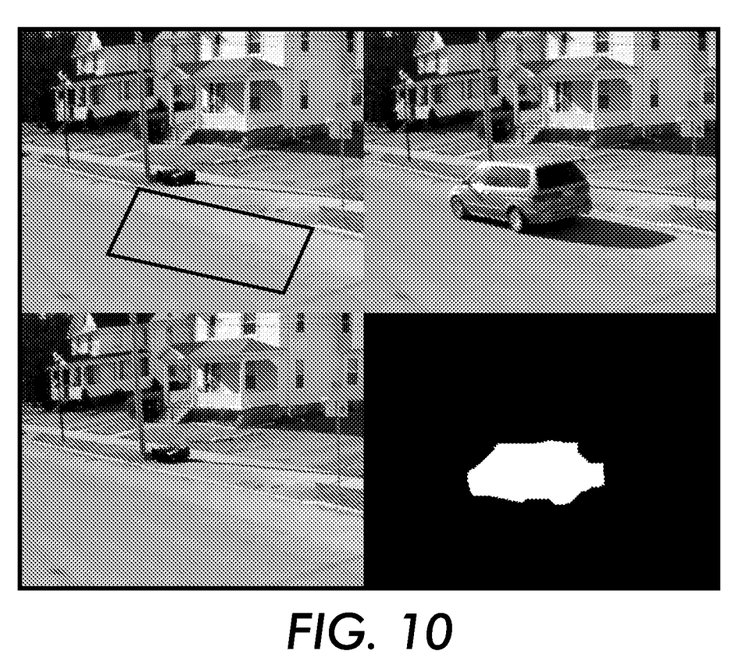

Similarly, FIGS. 9 and 10 show results of the example implementation for the exclusion zones located in front of the fire hydrant and the driveway, respectively. In all cases, vehicles that violated the regulations were successfully detected.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining a parking violation, the method comprising:
   receiving video data as a sequence of frames provided by an associated image capture device;
   defining a location of an exclusion zone in the video data;
   detecting a vehicle located in the defined exclusion zone;
   determining a duration that the detected vehicle is in the exclusion zone based on a number of the sequence of frames including the detected vehicle;
   comparing the duration to a threshold; and,
   in response to the duration meeting the threshold, indicating a parking violation,
   wherein the threshold is dependent on a type of exclusion zone being monitored.

2. The method of claim 1, where in the detecting of a vehicle includes:
   determining a background in an initial frame of the video data;
   determining a background in a select frame by applying a predetermined updating process;
   subtracting the background of the select frame from the select frame to obtain an image difference;
   classifying the pixels in the image difference as foreground or background pixels; and,
   classifying the pixels in the foreground as vehicle or non-vehicle pixels.

3. The method of claim 2, wherein the determining the background in the select frame includes:
   applying a predetermined updating factor p in an algorithm for each pixel in the select frame, wherein the updating factor p varies depending on a classification of a pixel belonging to the foreground or the background pixels in the current frame.

4. The method of claim 2, wherein the determining the background in the select frame includes:
   computing a function $B_{t+1} = \rho * F_{t+1} + (1-\rho) * B_t$, wherein $B_t$ is the background at time t, $F_{t+1}$ is a frame at time t+1, and p is an image updating factor for a pixel, wherein the updating factor p is selected from a group consisting:
   a "0" value for pixels belonging to a vehicle;
   a "1" value for pixels belonging to a location previously occupied by a vehicle in a corresponding location of the initial frame; and,
   a value $0 \leq p \leq 1$ for all other pixels.

5. The method of claim 2, where the classifying the pixels in the foreground includes:
   applying a threshold to the image difference;
   in response to the image difference meeting the threshold, classifying the pixel as belonging to a foreground.

6. The method of claim 2, wherein the detecting the vehicle further includes:
   applying morphological operations to the foreground image; and,
   in response to the morphological operations, classifying the pixel as belonging to a vehicle.

7. The method of claim 1, wherein the defining the location of the exclusion zone includes:
   receiving input designating the exclusion zone in the video data with a boundary.

8. The method of claim 1, wherein the defining the location of the exclusion zone includes:
   generating a model associating a three-dimensional location in an actual area of the exclusion zone to a two-dimensional pixel coordinate (x, y) in the video data; and, defining a location of the exclusion zone by mapping actual physical coordinates to pixel coordinates in the video data.

9. The method of claim 1, wherein the determining the duration includes:
using the background estimate, computing a number of frames in the sequence of frames that the vehicle is stationary; and,
converting the number of frames to a time duration.

10. The method of claim 9, wherein the computing the number of frames includes:
determining a first frame having an updating factor p being equal to "0" for a select pixel (i,j) belonging to the vehicle at a select location;
determining the number of frames following the first frame having the updating factor being equal to "0" for pixels located at corresponding locations to the first frame; and,
associating the first frame as a start time and the number of frames as a current time.

11. The method of claim 1 further comprising:
comparing the duration to a threshold;
in response to the duration meeting the threshold, determining if a parking condition is met; and,
in response to the parking condition being met, indicating that a parking violation is detected.

12. The method of claim 1 further comprising:
communicating the parking violation to a user device.

13. A computer program product comprising tangible media which encodes instructions for performing the method of claim 1.

14. A system for determining parking availability comprising:
a parking violation determination device comprising memory which stores instructions for performing the method of claim 1 and a processor, in communication with the memory for executing the instructions.

15. A system for determining a parking violation, the system comprising a parking violation determination device in communication with an associated image capture device adapted to monitor an exclusion zone over a duration of time, the parking violation determination device including:
a video capture module adapted to receive video data from the associated image capture device and corresponding to a sequence of frames each capturing the exclusion zone;
an exclusion zone detection module adapted to define a location of the exclusion zone in the video data;
a vehicle detection module adapted to detect a vehicle located in the defined exclusion zone;
a duration determination module adapted to:
determine a duration that a vehicle is in the exclusion zone based on a number of the sequence of frames including the vehicle pixels,
compare the duration to a threshold, and
in response to the duration meeting the threshold, indicate a parking violation; and,
a processor adapted to implement the modules.

16. The system according to claim 15, wherein the vehicle detection module is further adapted to:
determine a background in an initial frame of the video data;
determine a background in a select frame by applying a predetermined updating process;
subtract the background of the select frame from the background of the initial frame to obtain an image difference;
classify pixels in the image difference as belonging to one of foreground and background pixels; and,
classify the pixels in the foreground image as one of vehicle and non-vehicle pixels.

17. The system of claim 16, wherein the background estimation module is further adapted to:
apply a predetermined updating factor p in an algorithm computed for each pixel in the select frame, wherein the updating factor p varies depending on a classification of a pixel belonging to the foreground or the background pixels in a current frame.

18. The system of claim 16, wherein the vehicle detection module is adapted:
compute the function $B_{t+1}=\rho*F_{t+1}+(1-\rho)*B_t$, wherein $B_t$ is the background at time t, $F_{t+1}$ is a frame at time t+1, and p is an image updating factor for a pixel, wherein the updating factor p is selected from a group consisting:
a "0" value if a vehicle is detected at the pixel location;
a "1" value if another object is detected at a pixel location previously occupied by a vehicle; and,
a value $0 \leq p \leq 1$ for all other pixels.

19. The system of claim 16, wherein the duration determination module is further adapted to:
determine a first frame having the updating factor p being equal to "0" for a select pixel (i,j) belonging to the vehicle at a select location;
determine a number of frames following the first frame having the updating factor being equal to "0" for pixels located at corresponding locations to the first frame; and,
convert the number of frames to the duration.

20. The system of claim 15, wherein the vehicle detection module is adapted to:
apply the image difference to a threshold; and,
in response to the image difference meeting the threshold, classify the pixel as belonging to a vehicle,
wherein the threshold is dependent on a type of exclusion zone being monitored.

* * * * *